US 6,741,423 B2

(12) United States Patent
Shiga et al.

(10) Patent No.: US 6,741,423 B2
(45) Date of Patent: May 25, 2004

(54) MAGNETIC TAPE CARTRIDGE HAVING A LATCH SPRING WITH ONE OF AN INCLINED GUIDE SURFACE AND A BENT PORTION SUPPORTED BY A SUPPORT MEMBER

(75) Inventors: Hideaki Shiga, Kanagawa-ken (JP); Yusuke Ishihara, Kanagawa-ken (JP); Daisuke Takahashi, Kanagawa-ken (JP); Seiji Tsuyuki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 145 days.

(21) Appl. No.: 09/784,207

(22) Filed: Feb. 16, 2001

(65) Prior Publication Data

US 2001/0024343 A1 Sep. 27, 2001

(30) Foreign Application Priority Data

Feb. 16, 2000 (JP) ........................ 2000-038370
Mar. 1, 2000 (JP) ........................ 2000-055348
Mar. 1, 2000 (JP) ........................ 2000-055349

(51) Int. Cl.$^7$ ............................................. G11B 23/02
(52) U.S. Cl. ..................................................... 360/132
(58) Field of Search ................... 360/132; 242/348.2, 242/348

(56) References Cited

U.S. PATENT DOCUMENTS 6,345,779 B1 * 2/2002 Rambosek ............... 242/348.2

FOREIGN PATENT DOCUMENTS

| EP | 0 924 702 A1 | 6/1999 |
| EP | 0 926 675 | 6/1999 |
| EP | 0 926 675 A1 | 6/1999 |
| EP | 0 944 083 A1 | 9/1999 |
| JP | 11-242870 | 9/1999 |
| WO | WO 99/67786 A | 12/1999 |
| WO | WO 00/10169 A | 2/2000 |

* cited by examiner

Primary Examiner—George J. Letscher
(74) Attorney, Agent, or Firm—Sughrue Mion, PLLC

(57) ABSTRACT

A single-reel magnetic tape cartridge has a cartridge casing and a single reel around which a magnetic tape is wound and which is contained in the cartridge casing for rotation, in which the magnetic tape is fixed at the leading edge thereof to a leader pin employed for extracting the magnetic tape from the cartridge and the flanges at the upper and lower ends of the leader pin are engaged by the lateral drawing force of a latch spring removably held in the tape cartridge casing. Even for cases in which there is a deviation in the insertion position in which leader pin is inserted by the record and playback apparatus, etc. causing the entry path of the leader pin into the cartridge casing to be off track, etc., it is still possible for the leader pin to be inserted into the cartridge casing. The incline angle, in relation to the insertion direction of the leader pin, at the point at which the flanges of the leader pin are brought into abutment with the guide surface of the latch spring is set within the range of 30°±5°.

2 Claims, 11 Drawing Sheets

MAGNETIC TAPE CARTRIDGE HAVING A LATCH SPRING WITH ONE OF AN INCLINED GUIDE SURFACE AND A BENT PORTION SUPPORTED BY A SUPPORT MEMBER

BACKGROUND OF THE INVENTION

1. Field of the Invention

The present invention related to a magnetic tape cartridge, and in particular to a magnetic tape cartridge and a single reel around which a magnetic tape with a leader pin fixed to the leading end thereof is wound and which is contained in the cartridge casing for rotation, having a latch spring removably mounted at the cartridge casing tape outlet opening, and the cartridge case opening is provided with an opening and closing slide door and lock.

2. Description of the Related Art

There has been known a single-reel magnetic tape cartridge as for example the type disclosed in Japanese Unexamined Patent Publication No. 11(1999)-242870, comprising a cartridge casing and a single reel around which a magnetic tape is wound and which is contained in the cartridge casing for rotation, as a recording medium for an external storage device for a computer and the like. In this type of magnetic tape cartridge, a leader pin fixed to the lead end of the magnetic tape is engaged by the lateral drawing force of a latch spring fixed in the tape cartridge casing, and is removably held in the cartridge casing.

FIGS. 23 and 24 show a vertical cross-section view and a fragmentary horizontal cross-sectional view, respectively of the structure of the pin holding portion contained in aforementioned publication.

In FIGS. 23 and 24, synthetic resin cartridge casing 4 is formed by upper half 2 and lower half 3, and a single reel (not shown) around which the magnetic tape, connected at the tail end thereof to leader pin 5, is wound. A tape outlet opening 8 for drawing out the magnetic tape is formed on one sidewall of cartridge casing 4, and tape outlet opening 8 is provided with a slide door 20, which is movable in the direction parallel with the side of cartridge casing 4. Slide door 20 is propped in the direction of the closed position of tape outlet opening 8 by a door spring (not shown).

A concave recess 9 for extracting leader pin 5 is formed adjacent to tape outlet opening 8 of cartridge casing 4, and a latch spring 30 is provided for removably holding leader pin 5 in recess 9 when the magnetic tape cartridge is not in use and the tape is in the completely wound state.

When the magnetic tape cartridge is installed in the record and playback apparatus of an external storage device slide door 20 opens, leader pin 5 is drawn out by a robot arm of the record and playback apparatus, and the magnetic tape is drawn out to the predetermined running position from which reading and writing data thereto are possible.

Leader pin 5, as shown clearly in FIG. 23, comprises a shaft-shaped tape clamp 5a at the center thereof, around which the lead end of the magnetic tape is wound and secured in place by fastening a cross-sectional C clamp 5e. Tape clamp 5a is connected at its upper and lower ends to a pair of thin plate-shaped flanges 5d, and on the outside of flanges 5d in the axial direction are a pair of small diameter portions 5b, which are caught by the robot arm of the playback and record system, which are spaced by a pair of column-shaped flanges 5c.

Latch spring 30, as in the form shown in FIG. 25 for example, is formed of a plate spring pinched between respective upper and lower halves 2 and 3 of cartridge casing 4, and upper and lower flanges 5c of leader pin 5 are each inserted into respective recesses 9 on the upper and lower halves of cartridge casing 4 and removably held therein by latch spring 30.

As shown in FIG. 25, latch spring 30 is formed in a substantially U shape in plan and is symmetrical about the horizontal axis thereof, and comprises a vertical base portion 30a from the upper and lower ends of which extends a back plate 30c and a pair of arms 30b that extend substantially parallel to each other, on the free end portion of each arm 30b is provided a pin holding portion 30d. The area between upper and lower arms 30b is cut out, and arms 30b are formed so that only pin holding portion 30d is brought into abutment with flange 5c of leader pin 5. Each pin holding portion 30d protrudes in a mound-shape, and a rear inclined pin guide surface 31 is formed at the lead end thereof (FIG. 24). When leader pin 5 is held by the robot arm inserted into cartridge casing 4, at the first contact made with guide surface 31 by the outer circumference of flange 5c of leader pin 5, arm 30b of latch spring 30 presses against flange 5c and is resiliently deflected toward the side, and it is possible for leader pin to be inserted in to recess 9. Having passed guide surface 31, flange 5c of leader pin 5, as shown in FIG. 24, is held against the inner wall of recess 9 by the resilient force of pin holding portion 30d, and with this type of latch pin, with the fastening of respective upper and lower halves 2 and 3 of cartridge casing 4, the upper and lower edges of base portion 30a and back wall 30c are pinched and fixed in place by respective upper and lower halves 2 and 3.

FIG. 26 provides detailed illustration of the state in which leader pin 5 is inserted from tape outlet opening 8 into cartridge casing 4.

Recess 9, which accommodates leader pin 5, is provided with straight-line shaped guide walls 9A and 9B, for guiding flange 5c of leader pin 5 into the back of recess 9, and a semi-spherical holding wall 9c, which is of a slightly larger diameter than that of flange 5c.

Up until now, leader pin 5 has been designed so that the center axis S thereof passes through the center of the curvature of semi-spherical holding wall 9c in the back of recess 9 along a perpendicular center line L1 of the sidewall of tape outlet opening 8 of cartridge casing 4 and is inserted into the recess 9, and if flange 5c of leader pin 5 is brought into abutment with leader pin guide surface 31 of the free end of latch spring 31, flange 5c is drawn in, and by the pressure brought to bear against guide surface 31, arm 30b is deflected toward the side (left side of the Figure) whereby it becomes possible for leader pin 5 to be inserted into the back of recess 9, and flange 5c, which has been passed over guide surface 31 to the back of recess 9, is held by the resilient force of pin holding portion 30d of latch spring 30 in the holding wall of recess 9.

However, because there are instances in which, due to unevenness, etc. in the relative positions of the robot arm of the record and playback apparatus and the magnetic tape cartridge inserted therein, leader pin 5 is inserted into recess 9 in a state in which the center axis S thereof is off track to the left or right of center line L1 of recess 9, if recess 9 is widened on the tape outlet opening 8 side to and guide walls 9A and 9B are provided inclining surfaces opening toward the outward direction, even if leader pin 5 is inserted into recess 9 in a state in which the center axis S thereof is off-center with respect to center line L1, guide walls 9A and 9B are structured so as to guide flange 5c so that center axis S is directed toward the center of the curvature of holding wall 9c.

However, because there is also unevenness in the relative positions of guide surface 31 of latch spring 30, as shown in FIG. 26, when inserted into recess 9 from the state in which flange 5c of leader pin 5 is guided on guide wall 9A on the latch spring 30 side, if guide surface 31 is only pressed against by flange 5c, because arm 30b of latch spring 30 will not be deflected toward the side, and a problem arises in that it is not possible for leader pin 5 to be inserted into cartridge casing 4.

Guide surface 31 of latch spring 30 has a predetermined angle α' relative to parallel straight line L2 parallel to center line L1. Conventionally, α' has been an angle of 55°. Note that because the angle between guide wall 9a of recess 9 on the latch spring 30 side and aforementioned straight line L2 is 10°, angle β' between guide surface 31 and guide wall 9a on the latch spring 30 side is 45°.

Because of this, when flange 5c is in the state of being guided by guide wall 9A, there are cases in which when flange 5c is inserted into recess 9, a problem occurs in that arm 30b of latch spring 30 is not deflected to the side even if guide surface 31 is pressed against by flange 5c of leader pin 5.

On the one hand, there are a variety of latch springs available for use in holding leader pin 5 in recess 9 beside that of the form described above. However, when a latch spring is fitted to cartridge casing 4, depending on the type and attachment structure thereof, there is a difference in the amount of the leader pin holding portion at the lead edge of the latch spring that projects toward recess 9, and depending on the pin holding portion, the engaging strength thereof changes, and problems relating to instability in inserting and removing the pin arise.

In particular, when the latch spring fitted to upper half 3 and the latch spring fitted are separate parts, this is a cause of difference in the upper and lower engaging strength, and there is fear that leader pin 5 will tilt. In addition, if the amount of the pin holding portion of the latch spring that projects is small, the holding strength is weakened, and there is a chance that vibrations, etc. caused when magnetic cartridges are stored or shipped can cause leader pin 5 to be dislodged from recess 9, and conversely, if the amount of the pin holding portion that projects is large, there is a chance that the form of the latch spring will become deformed when magnetic tape cartridges are stored or shipped; in either case, faulty insertion and removal of leader pin 5 caused thereby give rise to the fear of diminished operational reliability.

FIG. 27 shows a possible type of construction of separate upper and lower latch springs. Latch spring 55 is formed of separate upper and lower wire spring members, provided with a pin holding portion 5a on the free end of each thereof that contacts leader pin 5, arms 55b extending from pin holding portions 55a in the direction opposite the tape outlet opening, and a base portion bent into a substantially L-shape and inserted into and fixed in a curved groove 56a of fixing portion 56 formed on the rear end portion of recess 25 on an inner wall of the cartridge casing, by which latch spring 55 is held in a predetermined position.

However, if the fixed position of latch spring 55 is supported only at the rear end position of arms 55b, which are the farthest removed from position at which leader pin is contacted, a microscopic displacement of fitting portion 55e of aforementioned fixing portion 55 has an effect on pin holding portion 55a, and the amount thereof that projects toward recess 9 of leader pin 5 changes, causing aforementioned weakening of engaging strength and instability in inserting and removing leader pin 5. Further, even if the fitting portion of the rear end of the arm portion of latch spring 55 is of a construction in which it is fixed to a projecting heat fused fixing portion, a displacement of the fitting portion of the fixing portion will cause the same change to the engaging power.

Also, in a magnetic cartridge of the type described above, if tape outlet opening 8 for extracting the magnetic tape is jarred open by a shock caused during shipping or storage thereof, or any other time it is not being used, because it is possible that foreign matter be inadvertently introduced to the inside of the cartridge casing, more than simply propping the slide door in the direction of the closed position by use of a door spring, but locking the slide door advantageously prevents inadvertent opening of the slide door and improves reliability.

SUMMARY OF THE INVENTION

In view of the circumstances described above, the first objective of the present invention is to provide a latch spring configuration assuring reliable, consistent, smooth insertion of the lead pin into the cartridge casing, regardless of unevenness based on deviation of the position in which the leader pin is inserted by the member of the record and playback apparatus, or inaccurate disposition of the guide surface of the latch spring.

The second object of the present invention is to provide a magnetic tape cartridge casing having a latch spring that assures for the accuracy of the position in which the lead pin is held is and stabilizes the engaging power to carry out accurate loading and retracting of the magnetic tape.

The third objective of the present invention is to provide a magnetic tape cartridge in which locking of the slide door in the closed state improves reliable operability thereof.

A magnetic tape cartridge of the first invention of the present application comprising a single reel around which a magnetic tape is wound, contained in a cartridge casing for rotation, the magnetic tape being attached at the lead end thereof to a leader pin for extracting the magnetic tape from the cartridge, the leader pin being removably held inside the cartridge casing at the both ends thereof by the lateral resilient force of a latch spring provided in the cartridge casing, the latch spring being provided with a guide surface that guides the leader pin when it is inserted into the cartridge casing and a holding portion that holds the leader pin within the case after it has passed the guide surface, wherein the diagonal angle of the guide surface at the point of contact with the leader pin with respect to the direction in which the leader pin is inserted is formed so that by only being pushed against by the leader pin, regardless of which of several positions from which the leader spring is inserted into the cartridge casing, is set so that the latch spring is deflected to the side.

More specifically, the angle at the point of contact with the leader pin, with respect to the direction from which the leader pin is inserted, is set within the range of 30°±5°.

In addition, in a magnetic tape cartridge of the second invention of the present application comprises a single reel around which a magnetic tape is wound, contained in a cartridge casing for rotation, the magnetic tape being attached at the lead end thereof to a leader pin for extracting the magnetic tape from the cartridge, the leader pin being removably held inside the cartridge casing at the both ends thereof in by the lateral resilient force of a latch spring provided in the cartridge casing, wherein in at least one place between the point at which the lead end comes in contact with the leader pin and the fixing portion fixed within the cartridge casing, a bent portion is provided, and between aforementioned holding portion supported by the supporting member of the bent portion and the bent portion a resiliently transformable arm portion is formed, and when the distance between the supporting member and the leader pin is designated as L, a distance S between the supporting member and the fixing portion, a relationship of S≧(⅓) L is sufficient. The angle of bend in aforementioned bent portion can be substantially 180° or 90°.

Also, in a magnetic tape cartridge of the third invention of the present application comprising a single reel around which a magnetic tape is wound, contained in a cartridge casing for rotation, provided with a tape outlet opening for extracting the magnetic tape from the cartridge casing and an opening and closing slide door, the slide door is provided with an opener portion that is brought into abutment with the door operating member of the record and playback apparatus and causes the slide door to move in the direction of the open position, and a lock portion that engages an engaging portion of the cartridge casing to lock the slide door in the locked position and connects with the door operating member of the record and playback apparatus, which disengages and unlocks the locking member from the engaging portion.

More specifically, the lock portion is provided at the upper and lower portions of the lead end of the slide door, and the of the contact surface of the opener portion that is brought into abutment with aforementioned door operating member can be formed as a slanted surface that connects with the door operating member and causes the lead end of slide door to move toward the opening position.

In addition, the lock portion can be provided in the opener portion of the slide door, and the opener portion can be formed so that when connected with the door operating member, the opener portion is moved or transformed in the direction in which the engaging portion and lock portion are disengaged and unlocked direction. In this case, a groove is formed above and below the opener portion, and it is preferable that the opener portion easily transforms into the unlock direction.

Also, the slide door can be of a type provided with a lock portion formed on a movable locking member so that the slide door slides into the open position, an unlocking member that moves the locking member to the locked position, wherein the slide door is propped by the resilient force of a spring into the closed position.

In this case, it is preferable that the unlocking member of the opener portion of the slide door faces the contacting portion of the door-operating member. Further, it is preferable to provide the slide door so that it is possible for the locking member to move in a substantially perpendicular direction to the opening and closing direction thereof.

Still further, in a magnetic tape cartridge of the fourth invention of the present application comprises a single reel around which a magnetic tape is wound, contained in a cartridge casing for rotation, provided with a tape outlet opening for extracting the magnetic tape from the cartridge casing and an opening and closing slide door, the slide door comprises an opener portion moved by the door operating member of the record and playback apparatus toward the direction of the open position, and a through-hole that serves as an engaging hole formed in a wall of the cartridge casing through which a projecting-type locking member provided with a warped portion is inserted and engaged from inside the cartridge casing to lock the slide door in the closed state, wherein an unlocking member inserted into the engaging hole from outside the cartridge casing transforms aforementioned warped portion through the projecting-type locking member, whereby the projecting-type locking member is moved to the unlocked position. In this case, the engaging hole is formed in the upper or lower wall of the cartridge casing and it is preferable that it be possible for the warped portion to move in a direction substantially perpendicular to that of the opening and closing of the slide door.

According to the first invention of the present application, by providing the guide surface of the latch spring with a diagonal angle at the point of contact with the leader pin so that by only being pushed against by the leader pin, regardless of which of several positions from which the leader spring is inserted into the cartridge casing, the latch spring is deflected to the side, even if there is inconsistency in relation to the path by which the leader pin enters the cartridge casing, and the leader pin can be emplaced in the cartridge housing in the predetermined position without impediment.

According to the second invention of the present application, the latch spring is provided with a bent portion in at least one place between the pin holding portion at the lead end thereof and the fixing portion fixed within the cartridge casing, said bent portion being supported by a supporting member so that the arm portion is provided so as to be resiliently transformable, and by providing distance S between the supporting member and the fixing portion greater than ⅓ of distance L, which is the distance between the supporting member and the leader pin holding portion, accuracy of the fitting position is improved, the amount of the leader pin holding portion that projects toward the emplacement portion is stabilized, insertion into and removal of the leader pin from the emplacement portion can be performed with accuracy, and reliable loading operability is assured.

According to the third and fourth inventions of the present application the by providing the tape outlet opening for extracting the magnetic tape a lock mechanism that locks the opening and closing slide door in the locked state thereof, even if tape outlet opening 8 for extracting the magnetic tape is jarred open by a shock, etc. caused during shipping or storage thereof, or any other time it is not being used, the slide door is maintained in the locked state and the entry of foreign matter into the inside of the cartridge casing is prevented, and reliability is improved.

In particular, for cases in which the engagement of the lock portion and the engaging portion is configured so as to be unlocked when the opener portion of the font end of the slide door is connected to the door operating member, it is advantageous that a specialized unlocking member does not have to be supplied separately.

DESCRIPTION OF THE PREFERRED EMBODIMENTS

Figure 1:
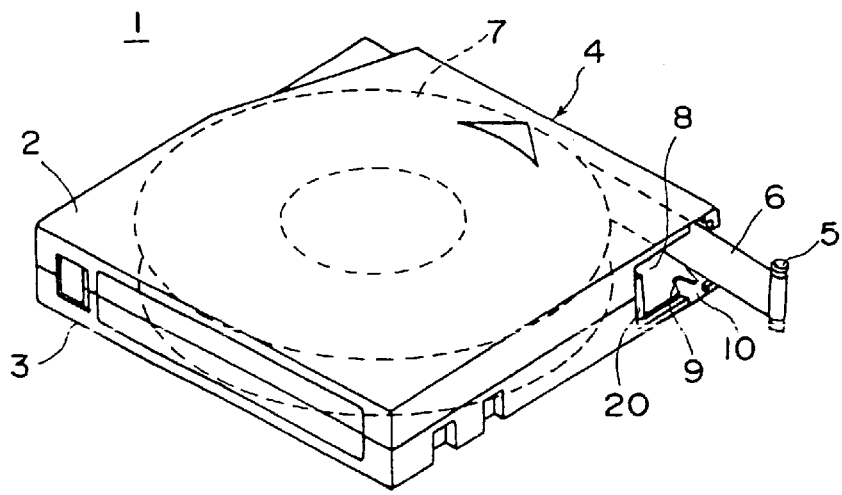
FIG. 1 is a perspective view of a magnetic tape cartridge implementing the present invention, with the magnetic tape in the extracted state.

Hereinafter, based on the embodiments illustrated in the drawings and with reference thereto, the present invention will be explained in detail.

FIG. 1 is a perspective view of an example of an embodiment of the magnetic tape cartridge of the present invention. Magnetic tape cartridge 1 comprises a substantially rectangular and flat cartridge casing 4 formed of upper half 2 and lower half 3 fastened together by screws, etc., and a single reel 7 around which is wound a magnetic tape 6, contained within cartridge casing 4 for rotation, and a loading-use leader pin 5 to which the tail end of magnetic tape 6 is fixed. On one sidewall (the left sidewall) of cartridge casing 4 (upper and lower halves 2 and 3) is formed a tape outlet opening 8, which is opened and closed by use of a door spring 12 described below that props a slide door 20 in the direction of the closing position, and in the vicinity to the side of tape outlet opening 8, a pair of concave recesses 9 are formed in the upper half 2 and lower half 3, into which leader pin 5 is emplaced and held.

In addition, when magnetic tape cartridge 1 is not being used, magnetic tape 6 is in the state in which it is completely wound around reel 7, and leader pin 5 to which the tail end of magnetic tape 6 is fixed is engaged and held in recess 9. Recess 9 is comprises a contiguous guide surface 10 structured so as to urge leader pin 5 toward tape outlet opening 8, and the flanges 5c of leader pin 5 are guided toward recess 9. Further, in order that leader pin 5 is removably held in recess 9, as shown for example in FIG. 26, a latch spring 30 is fitted in the vicinity of recess 9.

Note that, the insertion direction of magnetic tape cartridge 1 into the record and playback apparatus is the diagonal upper left direction of FIG. 1, and in this specification, the directions forward and rear correspond to aforementioned insertion direction.

Figure 2:
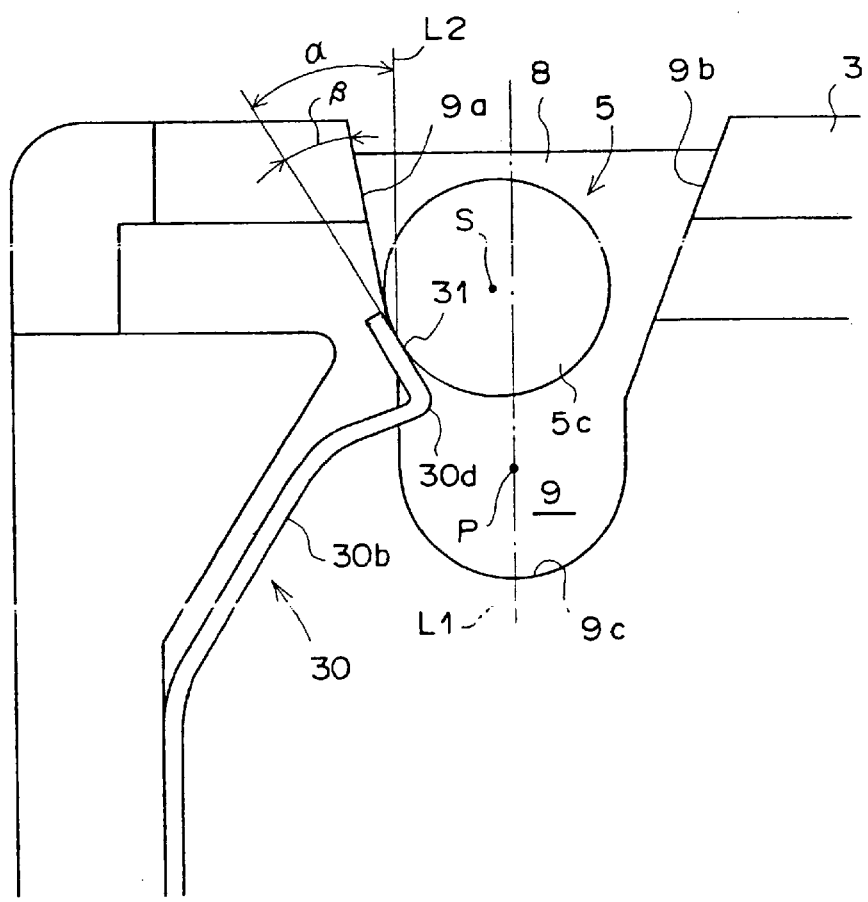
FIG. 2 illustrates the magnetic tape cartridge of the first invention of the present application, in the state in which the flange of the leader pin is brought into abutment with the guide surface of the latch spring when the leader pin is inserted into the cartridge casing.
Figure 26:
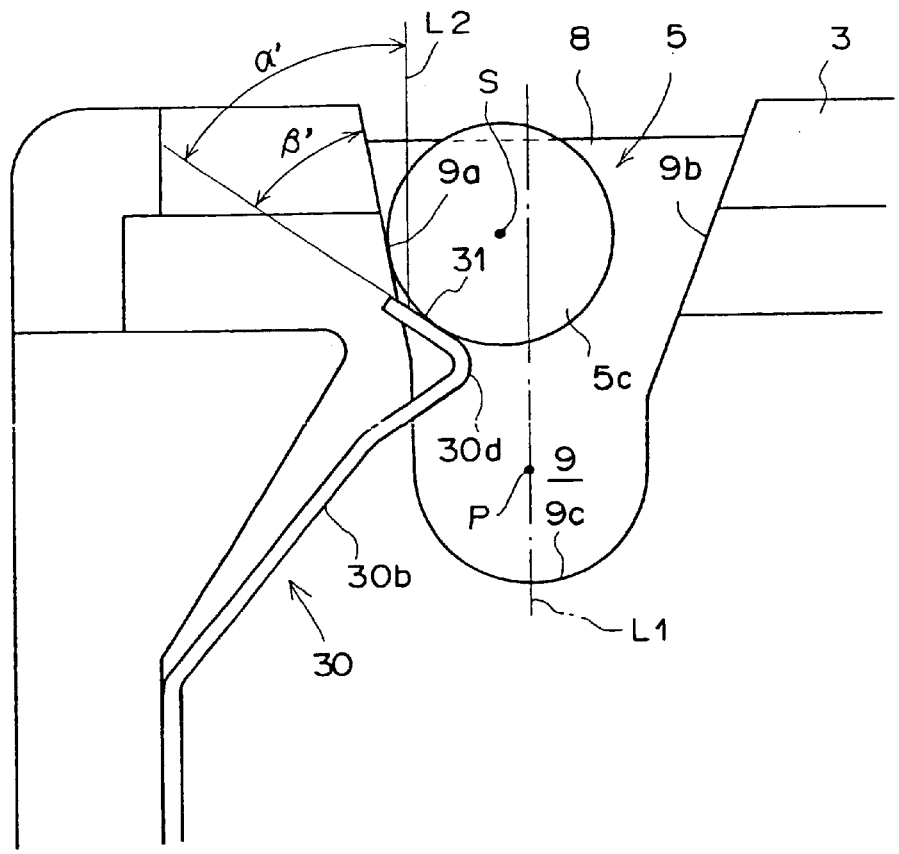
FIG. 26 illustrates a conventional magnetic tape cartridge, in the state in which the flange of the leader pin is brought into abutment with the guide surface of the latch spring when the leader pin is inserted into the cartridge casing, for purposes of explanation vis-à-vis FIG. 2.
Figure 27:
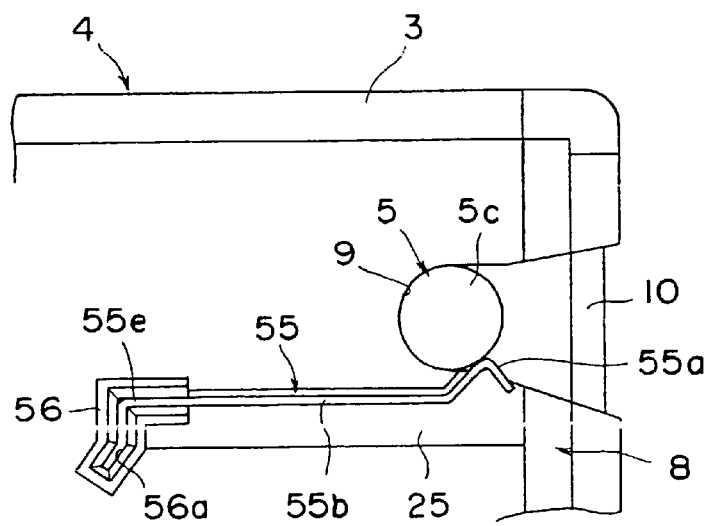
FIG. 27 is a plan view of the vicinity to the side of the tape outlet opening of a conventional magnetic tape cartridge, with the upper half of the cartridge casing removed.

FIG. 2 shows an embodiment of the magnetic tape cartridge according to the first invention of the present application. FIG. 26 corresponds to a view of the state in which guide surface 31 at the free end of latch spring 30 is brought into abutment with leader pin 5 when leader pin 5 is inserted into cartridge casing 4.

Leader pin concave emplacement recess 9 comprises inclined guide wall surfaces 9A and 9B that guide flanges 5c of leaer pin 5 into the back of recess 9, and a semispherical holding wall surface 9C, which is of a diameter slightly larger than that of flanges 5c.

In addition, leader pin 5 is basically structured so that the center axis S thereof passes through the center of the curvature of semi-spherical holding wall surface 9c in the back of recess 9 along a perpendicular center line L1 of the sidewall of tape outlet opening 8 of cartridge casing 4 and is inserted into the recess 9.

Latch spring 30 is provided with a pair of leader pin holding portions 30d formed at the end of resilient arms 30b. Each pin holding portion 30d protrudes in a mound-shape, and a rear inclined pin guide surface 31 is formed at the lead end thereof. Guide surface 31 inclines only at an angle α relative to straight line L2, which runs parallel to center line L1. The incline angle α is set within the range of 30°±5°. Therefore, the angle between guide wall surface 9a of recess 9 on the latch spring 30 side and aforementioned straight line L2 is 10°, and angle β between guide surface 31 and guide wall surface 9a on the latch spring 30 side is 20°±5°.

Figure 3:
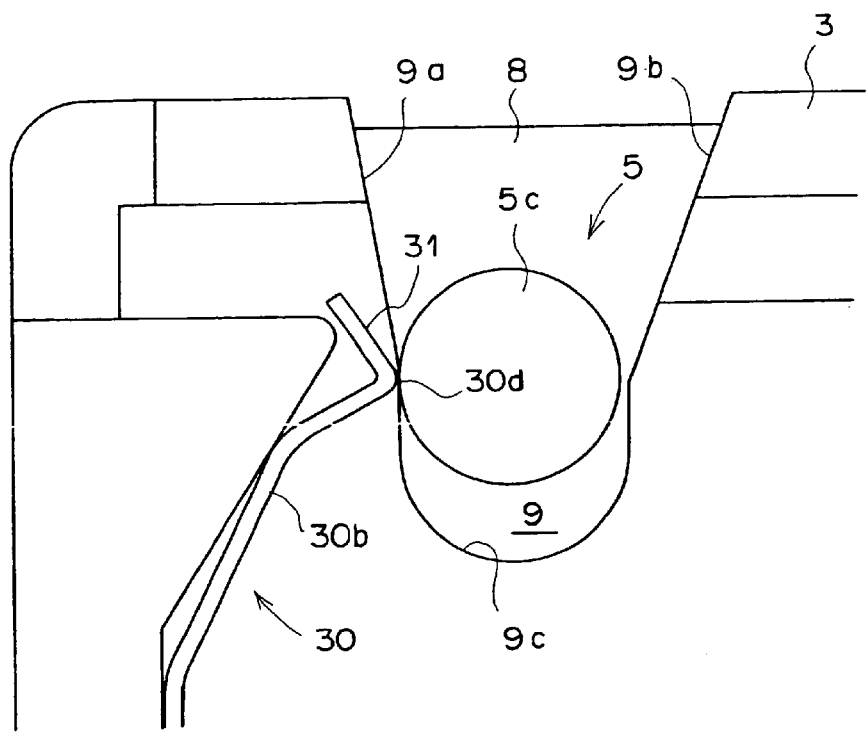
FIG. 3 illustrates the state of the embodiment of FIG. 2 in which the flange of the leader pin passes over the latch spring holding portion.

In this way, by having the incline angle α set within the range of 30°±5° in the current embodiment, even for cases in which the path along which leader pin 5 is inserted into cartridge casing 4 is off track, as shown in FIG. 3, wherein leader pin 5 is inserted at an inaccurate orientation to the degree and flange 5c of leader pin 5 is brought into abutment with guide wall surface 9A, and moreover even if the position of guide surface 31 of latch spring 30 is inaccurate, arm 30b of latch spring 30 is laterally deflected by the pressure of flange 5c brought into abutment with guide surface 31. As shown in FIG. 3, flange 5c reaches pin holding portion 30d of latch spring 30 and also passes over the mound of in holding portion 30d, and as shown in FIG. 4, by the resilient force of pin holding portion 30d of latch spring 30, flange 5c is pushed into holding wall surface 9c of recess 9 and held in place there.

The 30°±5° range of angle α is a value that was arrived at over the course of numerous experiments carried out by the developers of the present invention, etc. For cases in which there is a large deviance from this range, latch spring 30 is not smoothly deflected by only the insertion operation of leader pin 5, and if the deviation from said range is small, the angle at which leader pin 5 is received by guide surface 31 of latch spring 30 is small, whereby leader pin 5 is not able to be sufficiently guided; in either case, impediments to the insertion of leader pin 5 are incurred.

Figure 4:
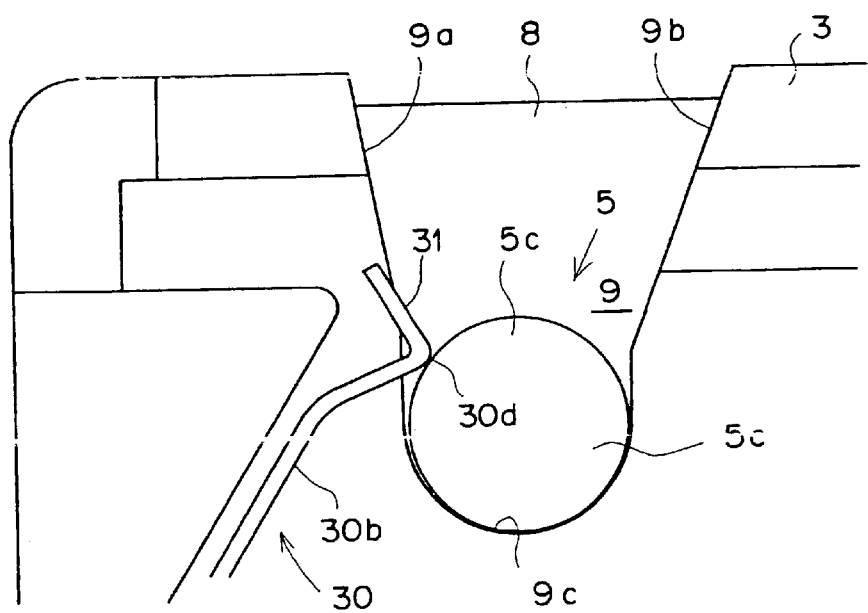
FIG. 4 illustrates the state of the embodiment of FIG. 2 in which the flange of the leader pin is held in the back of the recess of the cartridge casing.

Note that in FIGS. 2–4, latch spring 30 is shown as a straight line, and flat form, however, guide surface 31 can be formed as an oval or curved surface, in which case, if the angle α the point at which leader pin 5 and guide surf ace 31 are brought into abutment is in the range of 30°±5° it performs well. That is to say, at whatever position on guide surface 31 that flange 5c comes into contact, if the angle at the point of contact is within aforementioned range, regardless of the position at which leader pin 5 is inserted into cartridge casing 5, the pressure on arm 30b of latch spring 30 accompanying insertion operation of leader pin 5 causes arm 30b to be laterally deflected, whereby it is possible for leader pin 5 to be inserted into cartridge casing 5.

Figure 5:
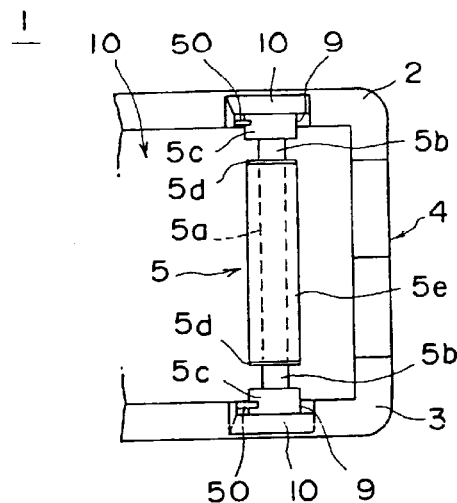
FIG. 5 is a front view of the vicinity to the side of the tape outlet opening of an embodiment of the magnetic tape cartridge of the second invention of the present application, in which the slide door is open.
Figure 6:
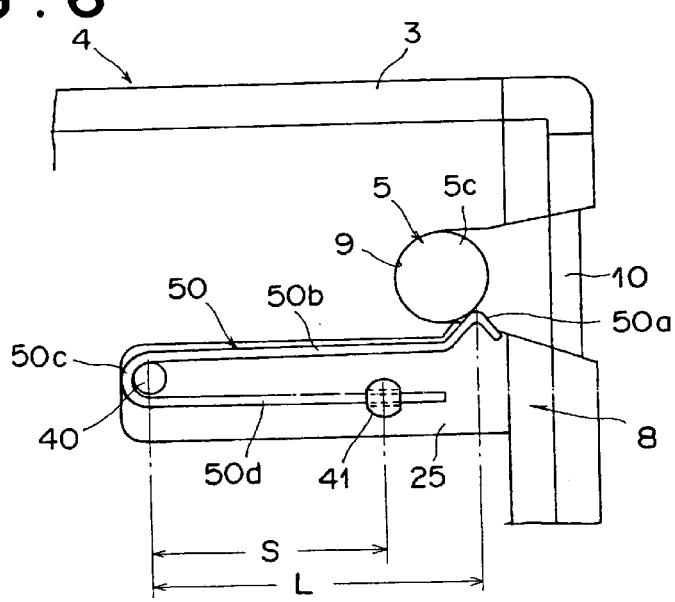
FIG. 6 shows the same view as FIG. 5, with the top half of the cartridge casing removed.

FIGS. 5–11 show an embodiment of the magnetic cartridge of the second invention of the present application. FIG. 5 is a front view of the vicinity to the side of tape outlet opening 8, in which the slide door is in the open state, FIG. 6 is a plan view of that shown in FIG. 5, with the top half of the cartridge casing removed, and FIGS. 7A and 7B are cross-sectional views of the fixing portion of FIG. 6 in before and after states, respectively, of its being heat fused closed.

As shown in FIG. 5, leader pin 5 is comprises a shaft-shaped tape clamp 5a at the center portion thereof, which is provided with a C clamp member 5e into which the lead end of magnetic tape 6 is inserted and clamped, said tape clamp portion 5a has connected on either end thereof a thin flange 5d, and on the outside the two flanges 5d in the axial direction thereof are small diameter portions 5b that are caught by the robot arm of the record and playback apparatus, which are separated by a pair of plate-shaped flanges 5c. Leader pin 5 is formed by shaving a metal rod (stainless steel, etc.), and the length of tape clamp portion 5a corresponds to the width of magnetic tape 6. C clamp member 5e is formed of synthetic resin and has an axial length corresponding to the length of tape clamp portion 5a of leader pin 5, extending across the entire length thereof in the axial direction a C-shaped slit is opened, and is structured so that magnetic tape 6 is inserted laterally from the outside of tape clamp 5a and elastically clamped.

Latch spring 50 that removably engages and holds leader pin 5, and in relation to leader pin 5, is fitted on the side opposite the front side surface of respective upper and lower halves 2 and 3, and on the top wall of upper half 2 and the bottom wall of lower half 3 are formed recess 25 for fitting latch spring 50.

As shown in FIG. 6, latch spring 50 of the current embodiment a substantially U-shaped (hairpin-shaped) wire spring, provided with a leader pin holding portion 50a at the free end thereof that is brought into abutment with the outer circumference of flange 5c of leader pin 5, a bent portion 50c that extends from leader pin holding portion 50a in the direction opposite tape outlet opening 8 and is bent into a substantially 180° oval shape, and a fitting portion 50d extending in the direction toward tape outlet opening 8 from bent portion 50. Leader pin holding portion 50a is formed in a mound-shape protruding toward the leader pin 5 side, when leader pin 5 inserted from tape outlet opening 8 and moved so as to be brought into abutment with the inclined surface at the lead end thereof, arm 50b is resiliently warped and leader pin 5 is pressed by the inclined surface on the inner side of leader pin holding portion 50a into the emplacement-use recess 9 and held there.

Figure 7A:
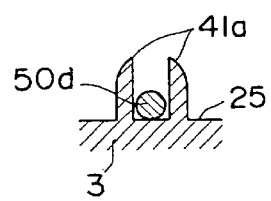
FIGS. 7A and 7B show the fixing portion of FIG. 6 before and after it has been heat fused.
Figure 7B:
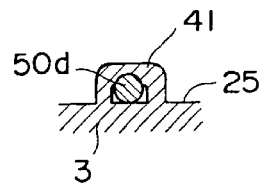

Bent portion 50c is engaged with and supported by boss-shaped supporting member 40, received in recess 25 and the side edge of fitting portion 50d is fixed by heat fused fixing portion 41. Fixing portion 41 before being heat fused, as shown in FIG. 7A, on both sides of inserted fitting portion 50d stand protrusions 41a. The lead ends of protrusions 41a are heat fused and, as shown in FIG. 7B, protrusions 41a on both sides have become an integral unit and fitting portion 50d is wrapped and sealed therein.

In the fitted state of latch spring 50, bent portion 50c is supported by supporting member 40 and arm 50b between leader pin holding portion 50a and bent portion 50c is resiliently transformable. The distance S between supporting member 40 and fixing portion 41 is equal to ⅓ or greater of the distance L between supporting member 40 and leader pin 5, that is, distance S is set to S≧(⅓) L.

Note that although latch spring 50 has around cross-section, it can also be formed of wire spring having an elliptical or angular cross-section.

According to the current embodiment, between leading pin holding portion 50a at the free end of latch spring 50 an fitting portion 50d there is provided a bent portion 50c, said bent portion 50d being supported by supporting member 40 so that arm 50b is resiliently transformable and by fitting portion 50d being fixed by upper and lower halves 2 and 3 that are fixed by fixing portion 41, the effect that the accuracy of the position of fixing portion 41 has on the position of leader pin 5 is basically reduced. Moreover, by setting the distance S between supporting member 40 and fixing portion 41 to greater than or equal to ⅓ of the distance L between supporting member 40 and leader pin holding portion 50a, the amount of leader pin holding portion 50a of the free end of latch spring 50 projecting toward receiving-use recess 9 is fixed, the engaging power in relation to leader pin 5 is stabilized, and insertion and removal of leader pin 5 can be performed with accuracy.

Figure 8:
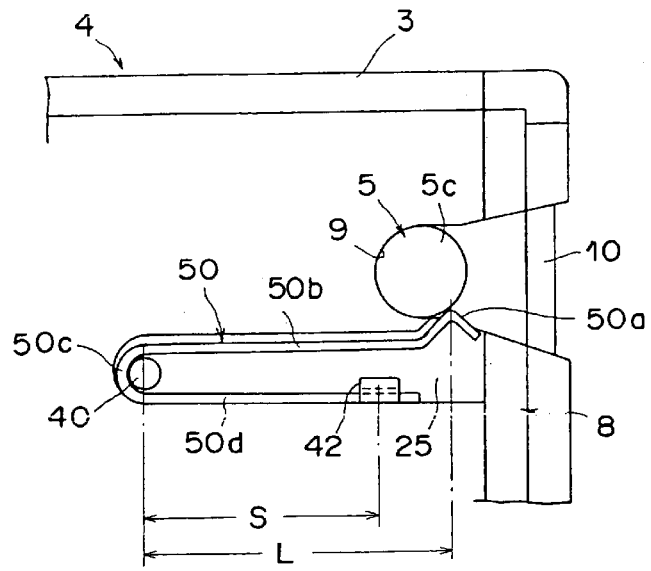
FIG. 8 is a plan view of the main part of the magnetic cartridge of another embodiment, with the upper half of the casing thereof removed.
Figure 9A:
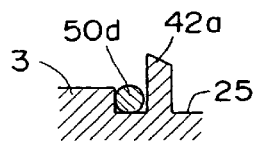
FIGS. 9A and 9B are cross-sectional views of the fixing portion of FIG. 8 before and after it has been heat fused.
Figure 9B:
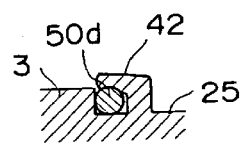

FIG. 8 is a plan view of the main part of an example of a changed type of that shown in FIG. 6, with the upper half removed for illustrative purposes. FIGS. 9A and 9B are cross-sectional views of the fixing portion before and after heat fusion has been performed.

The basic construction of upper and lower halves 2 and 3, leader pin 5, etc., and the type of latch spring in FIG. 8 are the same as those in FIG. 6, however, the structure of heat fused fixing portion 42 is different.

That is to say, as shown in FIG. 9A, before being heat fused, said fixing portion 42 has protrusion 42a on the sidewall of recess 25, and is in the state in which fitting portion 50d of the latch spring 50 is inserted between protrusion 42a and the sidewall. Then, the lead end of protrusion 42 is heat fused with the sidewall and, as shown in FIG. 9B, protrusion 42a wraps around and seals in fitting portion 50d.

In this case, with latch spring 50 in the fitted state, the distance S between supporting member 40 and fixing portion 42 is equal to ⅓ or greater of the distance L between supporting member 40 and leader pin holding portion 50a, that is, distance S is set to S≧(⅓) L. Because the other structures are the same as those in FIG. 6, the parts in common have the same reference numbers and explanation thereof is omitted.

Figure 10:
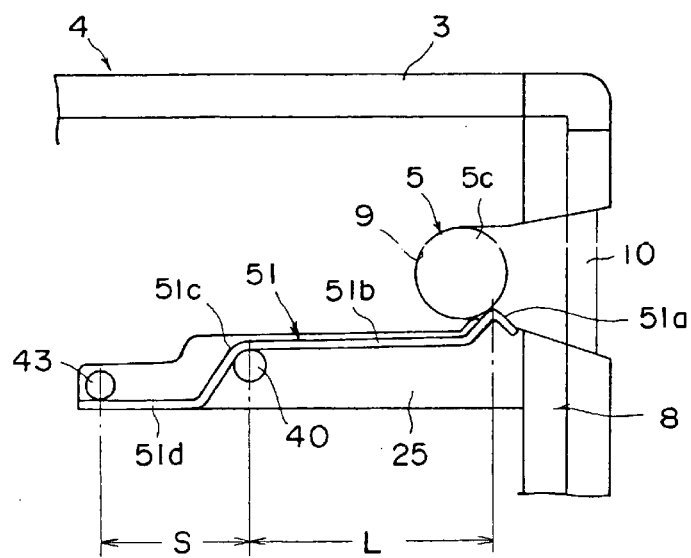
FIG. 10 is a plan view of the main part of an embodiment of a magnetic tape cartridge of the present invention having a different type of latch spring.

FIG. 10 is a plan view of the main part of a magnetic tape cartridge of the present invention having yet another different type of latch spring.

In this embodiment, latch spring 51 is a wire spring bent into a crank form, and is provided with leader pin holding portion 51a on the free end thereof that is brought into abutment with flange 5c of leader pin 5. Extending from leader pin holding portion 51a in the direction opposite tape outlet opening 8 is arm 51b, which is bent at bent portion 51c and bent again to the opposite side, and extending in the direction opposite tape outlet opening 8 and running substantially parallel to arm 51b is formed straight-line shaped fitting portion 51d.

Bent portion 51c of the base end of arm 51b is engaged with and supported by boss-shaped supporting member 40, received in recess 25 and the side edge of fitting portion 50d is inserted (pressure inserted) and supported between boss-shaped fixing portion 43 formed adjacent to the wall surface of recess 25 and the wall surface.

In the fitted state of latch spring 51, bent portion 51c is supported by supporting member 40 and arm 51b between leader pin holding portion 51a and bent portion 51c is resiliently transformable. The distance S between supporting member 40 and fixing portion 43 is equal to ⅓ or greater of the distance L between supporting member 40 and leader pin holding portion 51a, that is, distance S is set to S≧(⅓) L.

Figure 11:
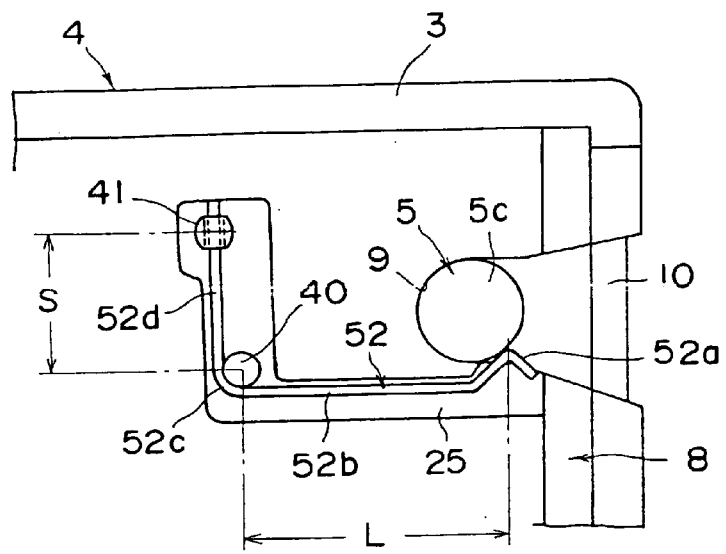
FIG. 11 is a plan view of the main part of an embodiment of a magnetic tape cartridge of the present invention having yet another different type of latch spring, with the upper half of the cartridge casing removed.

FIG. 11 is a plan view of the main part of a magnetic tape cartridge of the present invention having still yet another different type of latch spring.

In this embodiment, latch spring 52 is a substantially L-shaped wire spring, and is provided with leader pin holding portion 52a on the free end thereof that is brought into abutment with flange 5c of leader pin 5. Extending from leader pin holding portion 51a in the direction opposite tape outlet opening 8 is arm 52b, which is bent at a substantially 90° angle, and extending in the direction toward the back of recess 9 is straight-line shaped fitting portion 52d.

Bent portion 52c of the base end of arm 52 is engaged with and supported by boss-shaped supporting member 40, received in recess 25 and the side edge of fitting portion 50d is fixed by heat fused fixing portion 41 in the same as in FIGS. 6 and 7.

In the fitted state of latch spring 52, bent portion 52c is supported by supporting member 40 and arm 52b between leader pin holding portion 52a and bent portion 52c is resiliently transformable. The distance S between supporting member 40 and fixing portion 43 is equal to ⅓ or greater of the distance L between supporting member 40 and leader pin holding portion 51a, that is, distance S is set to S≧(⅓) L.

Note that in each of the embodiments described above, leader pin holding portions 50a–52a of latch springs 50–52 are disposed so as to project toward recess 9 from the side remote from the side wall of the front side (upper side of Figure) of upper and lower halves 2 and 3, however, the latch spring can also be disposed on the opposite side from this, on the front side. In that case, a latch spring formed of wire spring, etc. as separate upper and lower members is used: the bent portion thereof being supported by a supporting member; the fitting portion being fixed by a fixing portion; and as described above, the distance S between the supporting member and the fixing portion is set so as to be equal to ⅓ or greater of the distance L between the supporting member and the leader pin holding portion.

Figure 12:
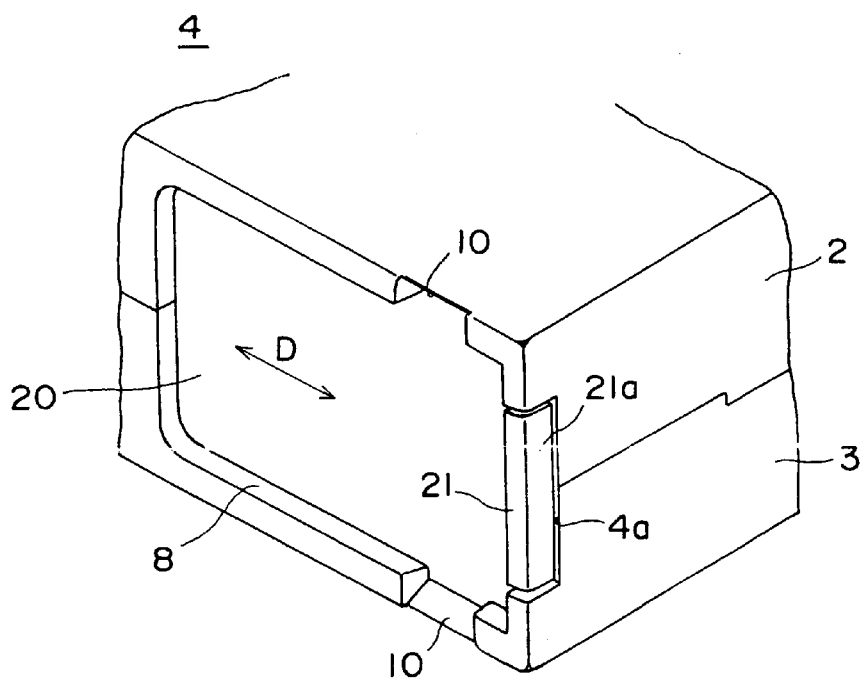
FIG. 12 is a perspective view of the vicinity to the side of the tape outlet opening of the magnetic tape cartridge according to the third invention of the present application, in the state in which the slide door is closed.
Figure 13:
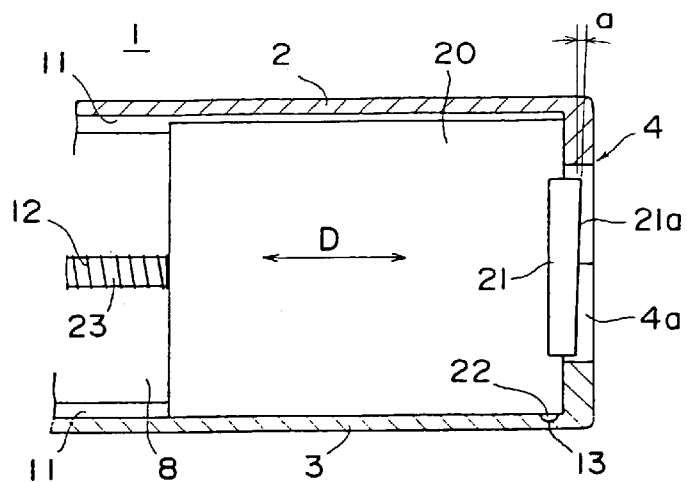
FIG. 13 is a front cross-sectional view of the vicinity to the side of the tape outlet opening of FIG. 12 with the slide door in the locked state.
Figure 14:
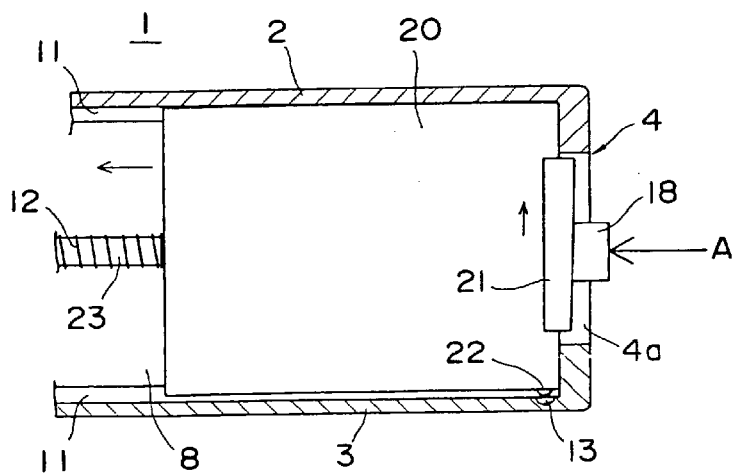
FIG. 14 is front cross-sectional view of the vicinity to the side of the tape outlet opening of FIG. 13 in the unlocked state.

Next, FIGS. 12–14 show an embodiment of a magnetic tape cartridge according to the third invention of he present application. FIG. 12 is a perspective view of the vicinity to the side of the tape outlet opening with the slide door in the closed state. FIG. 13 is a front cross-sectional view of the vicinity to the side of the tape outlet opening with the slide door in the locked state. FIG. 14 is front cross-sectional view of the vicinity to the side of the tape outlet opening in the unlocked state.

As shown in FIG. 1, magnetic tape cartridge 1 comprises a substantially and flat cartridge casing 4 formed of upper half 2 and lower half 3 fastened together by screws, etc., and a single reel 7 around which is wound a magnetic tape 6, contained within cartridge casing 4 for rotation, and a loading-use leader pin 5 to which the tail end of magnetic tape 6 is fixed. On one sidewall (the right sidewall) of cartridge casing 4 (upper and lower halves 2 and 3) is formed a tape outlet opening 8, which is opened and closed by use of a door spring 12 (refer to FIG. 13) that props a slide door 20 into the direction of the closed position, and in the vicinity to the side of tape outlet opening 8 is formed a door rail 11 (refer to FIG. 13) in the form of a groove in which slide door 20 slides.

In addition, when magnetic tape cartridge 1 is not being used, magnetic tape 6 is in the state in which it is completely wound around reel 7, and leader pin 5 to which the tail end of magnetic tape 6 is fixed is engaged ad held in recess 9. Recess 9 is comprises a contiguous guide surface 10 structured so as to urge leader pin 5 toward tape outlet opening 8, and the end portion of leader pin 5 is guided toward recess 9. Further, in order that leader pin 5 is removably held in recess 9, as shown for example in FIG. 26, a latch spring 30 is fitted in the vicinity of recess 9.

Tape outlet opening 8 is substantially rectangular, and slides between the open and closed positions along door rail 11 formed on the upper and lower edges of respective upper and lower halves 2 and 3. On the lead end of slide door 20, excepting the upper and lower edges thereof, is formed in the center portion thereof an outward projecting opener portion 21. Further, on the open edge of the front end portion of tape outlet opening 8 of cartridge casing 4 a section is cut out that corresponds to the width of aforementioned opener portion 21. As shown in FIG. 12, opener portion 21 of slide door 20 is slid into this cut out section 4a in the closed state the lead end edge of slide door 20 is brought into abutment with the upper and lower edges of cut out section 4a and stopped in the closed position, and the front-end surface 21a of opener portion 21 is exposed at the front side of cartridge casing 4. Therefore, when magnetic tape cartridge 1 is inserted and loaded into the record and playback apparatus, front-end surface 21a of opener portion 21 is brought into abutment with the door operating member 18 (refer to FIG. 14) of the record and playback apparatus, resistance is applied to door spring 12 and slide door 20 is opened.

As shown in FIGS. 13 and 14, on the lower face of the front end of slide door 20 is formed a downward projecting lock portion, which engages with a concave engaging portion 13 formed on the bottom surface of door rail 11 so as to lock slide door 20 in the closed position. Further, the upper portion of front-end surface 21a of opener portion 21 of the lead end of slide door 20, that is, the surface brought into abutment with aforementioned door operating member 18, is formed as a forward inclining surface with a predetermined incline angle A (for example 0.3°) relative to the base surface perpendicular to door opening and closing direction D. That is to say, as shown in FIG. 14, in the state wherein front-end surface 21a is brought into abutment with door operating member 18, the force component exerted by inclined front-end surface 21a relative to pressure A is improved, in the upper direction in which the lock portion 22 of the lower portion of slide door 20 and the engaging portion 13 are released, door operating member 18 is able to smoothly move upward.

Note that extending rearward from the rear end of slide door 20 is a rod 23 connected thereto, which has compressedly loaded on the outer circumference thereof a door spring 21 composed of a coil spring that props slide door 20 in the direction of the closed position. In addition, lock portion 22 is formed so that the amount protruding therefrom is less than the gap between the upper and lower edges of slide door 20 in door rail 11, and lock 22 is released by the amount of movement of slide door 20 in the up and down directions within door rail 11. In that case, in the state in which slide door 20 is closed as shown in FIG. 13, the propping direction of door spring 12 can be set so that the front end of slide door 20 receives downward propping force, whereby the engaging of lock portion 22 and engaging portion 13 is improved. Further, lock 22 can be formed concave and engaging portion 13 convex.

According to the current embodiment, when in a state in which it is not being used, such as storage, etc., slide door 20 is propped toward the closing position by door spring 12, and with tape outlet opening 8 in the totally closed position, lock portion 22 is engaged with engaging portion 13 so that slide door 20 is locked and does not open due to the impact from being dropped, etc. When magnetic tape cartridge is used, as shown in FIG. 14, accompanying loading thereof into a record and playback apparatus, front-end surface 21a of opener portion 21 is brought into abutment with door operating member 18 and slide door 20 is pushed toward the opening position. In accordance with pressure A, front end surface 21a, inclined at predetermined angle A, of opener portion 21 moves upward so that moves door operating member 18 smoothly upward, lock 22 and engaging portion 13 are unlocked, and it becomes possible to open slide door 20. In this way, the operating power of door operating member 18 is used to unlock the locked state, and there is no need to provide an exclusive-use unlocking member in the current embodiment.

Figure 15:
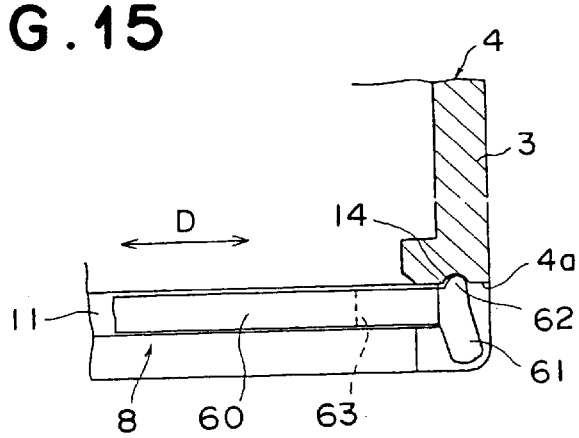
FIG. 15 is a cross-sectional plan view of the slide door of another embodiment in the locked state.
Figure 16:
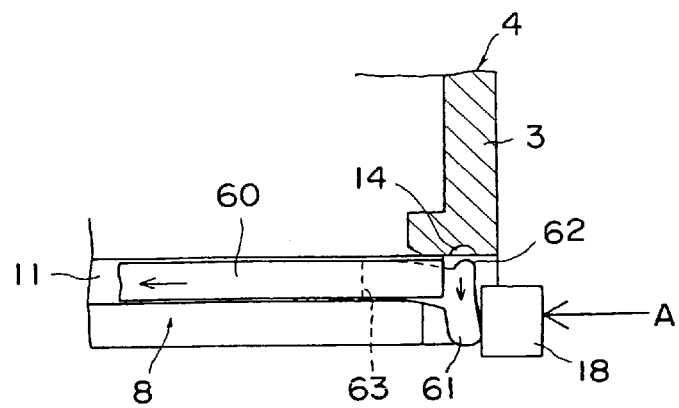
FIG. 16 is the same cross-sectional plan view of FIG. 15 in the unlocked state.
Figure 17:
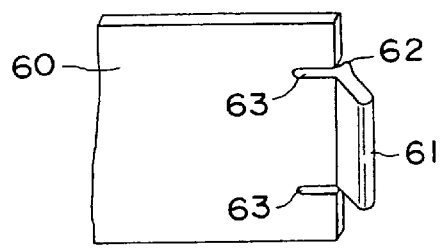
FIG. 17 is a perspective view of the lead end of the slide door of FIG. 15.

Next, FIGS. 15–17 show an embodiment of a door lock of a different construction. FIG. 15 is a cross-sectional plan view of the lead end of the slide door in the locked state. FIG. 16 is the same cross-sectional plan view of FIG. 15 in the unlocked state. FIG. 17 is a perspective view of the lead end of the slide door of FIG. 15.

Slide door 60 of the current embodiment has at the lead end thereof opener portion 61 that is brought into abutment with door operating member 18, and a projecting lock portion 32 formed on the back side of the inside of opener portion 61, said lock portion 32 couples with concave engaging portion 14 formed on the end surface of aforementioned cut out section 4a of cartridge casing 4 so as to lock slide door 20 in the locked position. Further, as shown in FIG. 17, a slit groove 63 is formed at each of an upper-end portion and an lower-end portion of the base of opener portion 61 of slide door 60, so that the base of the opener portion 61 has lowered stiffness enabling resilient transform thereof, and a portion between the loch 62 and the lead end of the opener portion 61 is inclined so as to project forward. Therefore, when opener portion 61 receives operating force A from door operating member 18, as shown in FIG. 16, opener portion 61 faces outward, that is, it is transformed in the direction unlocking lock portion 62 and engaging portion 14.

According to the current embodiment, when the magnetic tape cartridge is not being used, such as when in storage, etc., in the state in which slide door 60 totally closes tape outlet opening 8, lock portion 32 of opener portion 61 is coupled with engaging portion 14 so that slide door 20 is locked and does not open due to the impact from being dropped, etc. Then, to open slide door 60, as shown in FIG. 16, door operating member 18 is brought into abutment with the front end of opener portion 61 and according to pressure A, opener portion 61 is transformed in the outward direction unlocking engagement between locking portion 62 and engaging portion 14, and it becomes possible to open slide door 60. In the current embodiment, the operating power of door operating member 18 is used to unlock the locked state, and there is no need to provide an exclusive-use unlocking member.

Figure 18:
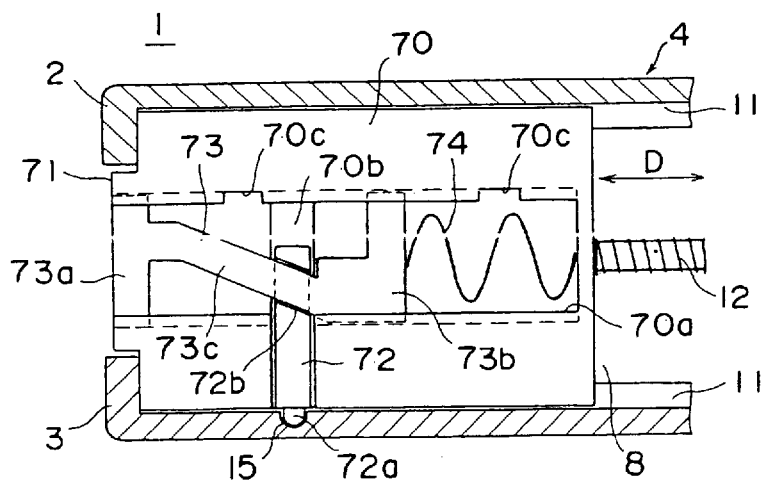
FIG. 18 is rear cross-sectional view of yet another embodiment of the slide door, in the locked state.
Figure 19:
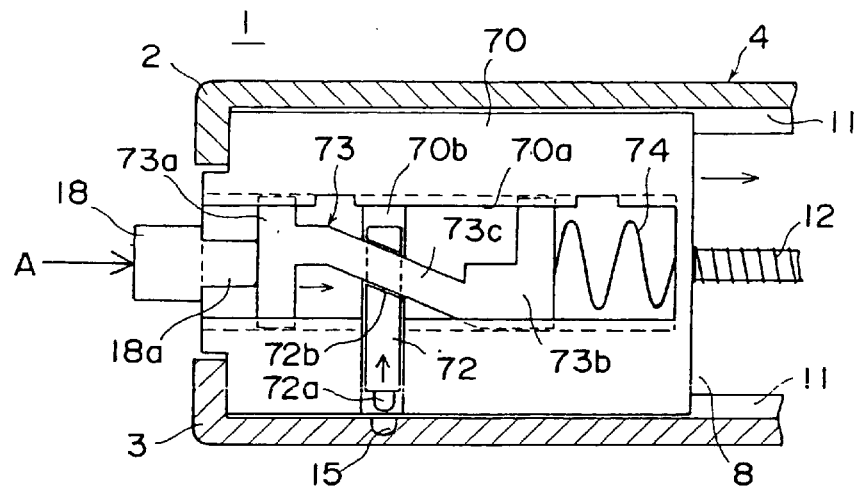
FIG. 19 is the same rear cross-sectional view of FIG. 18, in the unlocked state.
Figure 20A:
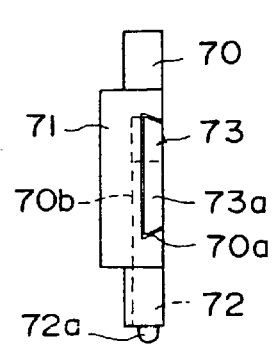
FIGS. 20A and 20B are a side and bottom view, respectively, of the slide door of FIG. 18.
Figure 20B:
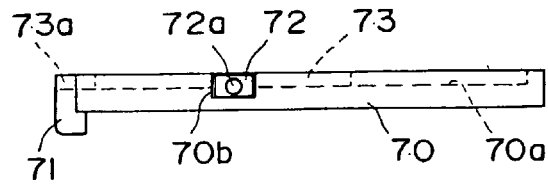

Next, FIGS. 18–20B show an embodiment of a door lock of yet another construction. FIG. 18 is rear cross-sectional view of the slide door in the locked state. FIG. 19 is the same rear cross-sectional view in the unlocked state. FIGS. 20A and 20B are a side and bottom view, respectively, of the lead end of the slide door.

In slide door 70 of the current embodiment, there is a lock mechanism emplaced inside the backside thereof. On the front end of slide door 70 is formed opener portion 71 that is brought into abutment with door operating member 18, extending from said opener portion 71 in the door opening and closing direction D in a predetermined width is formed a concave portion 70a, and intersecting midway with concave portion 70a is slide groove 71b extending in the direction running through door opening and closing direction D. Rod shaped locking member 72 provided with engaging groove 72b, which is inclines relative to opening and closing direction D of slide door 70, is slideably inserted into groove 70b.

Also, unlocking member 73 is slideably inserted into aforementioned concave portion 70a. Unlocking member 73 has on the front end thereof a pressure portion exposed to the front end surface of opener portion 71 of slide door 70, and inclined portion 73c connected with the rear portion of slide base 73b, said inclined portion 73c couples with the inclined engaging groove 72b of aforementioned locking member 72, and in accordance with the sliding of unlocking member 73, projecting lock portion 72a is connected so as to project from and recede into the lower end of sliding door 70.

On the rear portion of unlocking member 73 is compressedly loaded a propping spring 74 that props unlocking member 73 in the forward direction. Further, projecting lock portion 72a is formed on the lower end of locking member 72, said lock portion 72a projects from and recedes into the lower end of slide door 70, and in the projecting state, engages with concave engaging portion 15 on the bottom surface of door rail 11 of lower half 3 to lock slide door 70 in the closed position, and if locking member 72 moves in the upward direction, the engagement is separated and unlocked.

Note that, as shown in FIG. 18, the engagement between concave portion 70a and unlocking member 73 is constructed in the form of a bevel joint, and the locking member 72 taken hold of unlocking member 73 from notched portion 70c formed on one portion of concave portion 70a are installed, and afterwards, propping spring 74 is taken hold of. On the one hand, a projecting portion 18a is provided on the lead edge of door operating member 18 and a step portion is formed, and at first, projecting portion 72a is brought into abutment with the front end of pressure portion 73a of unlocking member 73, causing unlocking member 73 to withdraw, and by this, locking member 72 is slid upward by the cam-like action of unlocking member 73 and the lock is unlocked.

According to the current embodiment, when the magnetic tape cartridge is not being used, such as when in storage, etc., when slide door 70 is in the position in which tape outlet opening 8 is totally closed, unlocking member 73 is moved in the forward direction by propping spring 74, lock portion 72a of the lead edge of locking member 72 projects from the lower end of slide door 70 and engages with engaging portion 15 so that slide door 70 is locked and does not open due to the impact from being dropped, etc. Then, as shown in FIG. 19, projecting portion 18a of door operating member 18 is brought into abutment with the front end surface of pressure portion 73a of unlocking member 73, and by the withdrawal of unlocking member 73, the action of inclined portion 73 causes locking member 72 to move in the upward direction and lock portion 72a and engaging portion 15 are unlocked, whereby it becomes possible to open slide door 70. In the current embodiment, the operating power of door operating member 18 is used to unlock the locked state, and there is no need to provide an exclusive-use unlocking member.

Figure 21:
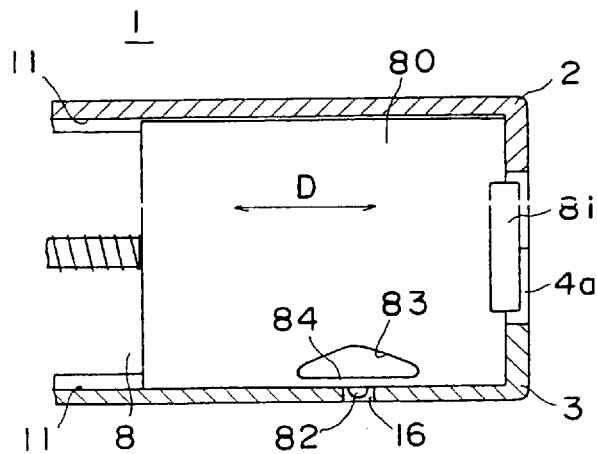
FIG. 21 is a front cross-sectional view of the vicinity to the side of the tape outlet opening of a magnetic tape cartridge according to the fourth invention of the present application, which shows the slide door in the locked state.
Figure 22A:
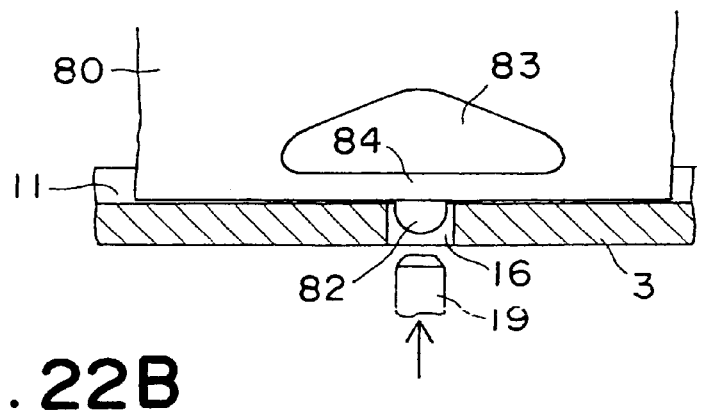
FIGS. 22A and 22B are cross-sectional views of the main part of the slide door of FIG. 21 in the locked and unlocked states, respectively.
Figure 22B:
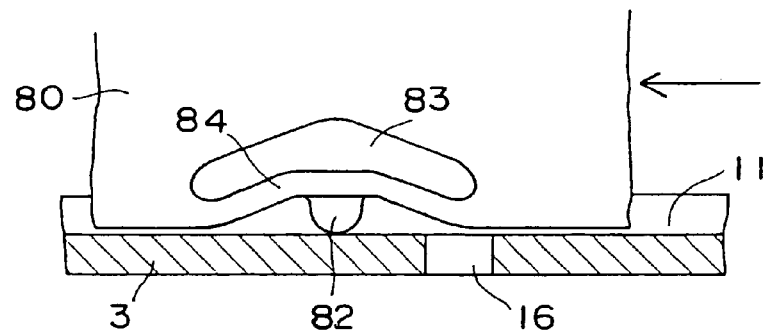
Figure 23:
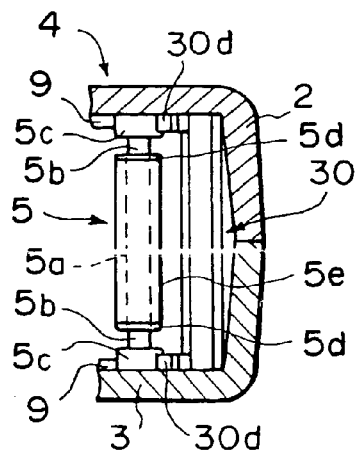
FIG. 23 is a vertical cross-sectional view of the main part of the structure of the leader pin in a conventional magnetic tape cartridge.
Figure 24:
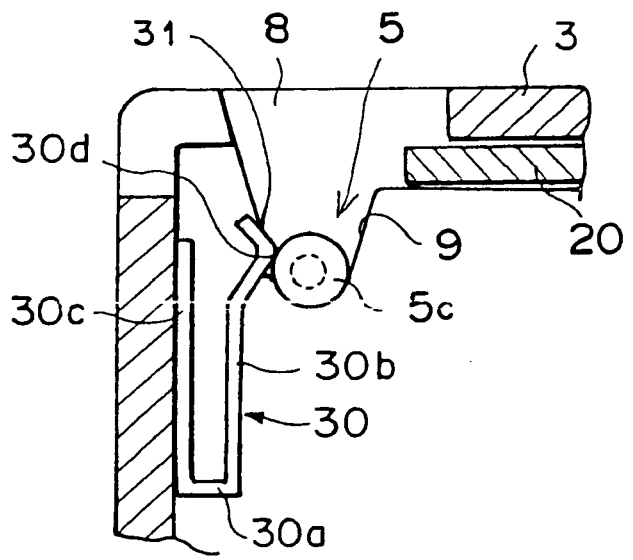
FIG. 24 is a cross-sectional plan view of one part of that shown in FIG. 23.
Figure 25:
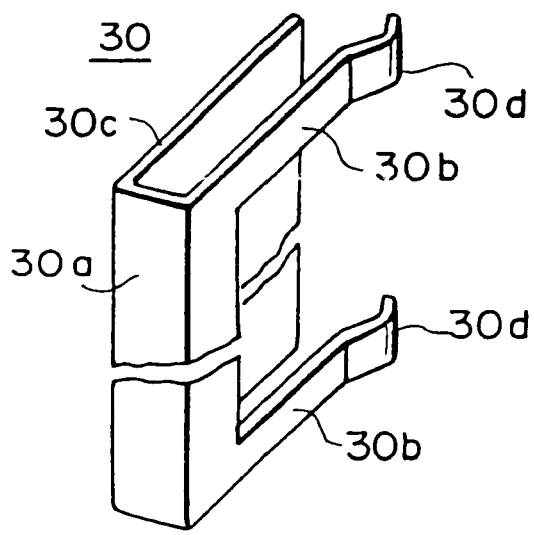
FIG. 25 is a perspective view of the latch spring of FIGS. 23 and 24.

Next, FIGS. 21, 22A and 22B show an embodiment of a magnetic tape cartridge according to the fourth invention of the current application. FIG. 21 is a front cross-sectional view of the slide door in the locked state. FIGS. 22A and 22B are cross-sectional views of the main part of the lock in the locked and unlocked states, respectively.

Slide door 80 of the current embodiment is provided at the front end thereof with an opener portion 81 that is brought into abutment with door operating member 18 to move slide door 80 in the direction of the opening position, and on the lower portion thereof is formed a downward projecting convex lock portion 82, said lock portion 82 couples with the through-hole serving as a concave engaging portion on the bottom surface of door rail 11 of lower half 3 to lock slide door 80 in the closed position. Above lock portion 82 of slide door 80 is formed an opening 83, and by this, the lower edge of opening 83 is formed as a thin warped portion 84 that is warpedly transformed toward the inside of opening 83 when downward pressure is applied to lock portion 82 so as to permit lock 82 to move in the upward direction. In addition, engaging portion 16 of lower half 3 asses through the casing wall and by coming into contact with exterior lock unlocking member 19 (refer to FIG. 22), lock portion 82 is pushed up and warped portion 84 is warpedly transformed toward the inside of opening 83, and lock portion 82 is extracted from engaging portion 16 and the locked state is unlocked.

According to the current embodiment, when the magnetic tape cartridge is not being used, such as when in storage, etc., in the state in which slide door 80 is in the position in which tape outlet opening 8 is totally closed, lock portion 82 is coupled with engaging portion 15 so that slide door 80 is locked and does not open due to the impact from being dropped, etc. To open slide door 80, as shown in FIG. 22B, when lock unlocking member 19 is inserted from the outside of lower half 3 into engaging portion 16 and lock portion 82 is pushed up, through lock portion 82, warped portion 84 is transformed and lock portion 82 is uncoupled from engaging portion 16 and the locked state is unlocked. By the forward end of opener portion 81 being brought into abutment with door operating member 18, slide door 80 is opened. In the current embodiment, aside from door operating member 18, the record and playback apparatus is also required to be equipped with lock unlocking member 19.

What is claimed is:

1. A magnetic tape cartridge comprising:

a cartridge casing;

a single reel around which a magnetic tape is wound and which is contained in the cartridge casing for rotation;

a leader pin fixed to a lead edge of the magnetic tape;

a latch spring provided in the cartridge casing, the latch spring removably holding an end of the leader pin within the cartridge casing, the latch spring being laterally deflectable by the leader pin when the leader pin is inserted into the cartridge casing, the latch spring provided with a guide surface that facilitates insertion of the leader pin into the cartridge casing and a holding portion that holds the leader pin within the cartridge casing after the leader pin has passed over the guide surface, wherein an incline angle at a point at which the leader pin is brought into abutment with the guide surface, relative to an insertions direction of the leader pin, is set within a range of 30°±5°.

2. A magnetic tape cartridge according to claim 1, wherein the incline angle is divided into two portions by a guide wall surface of the cartridge casing, and wherein an angle of the guide wall surface relative to the insertion direction of the leader pin is set at 10°, and an angle between the guide surface and the guide wall surface is set within a range of 20°±5°.

* * * * *